(12) United States Patent
Madiar et al.

(10) Patent No.: US 12,091,081 B2
(45) Date of Patent: Sep. 17, 2024

(54) METHOD AND APPARATUS FOR DETERMINING A BACKUP PATH

(71) Applicants: Matthew Madiar, Bensenville, IL (US); Lavern Meissner, Charlotte, NC (US)

(72) Inventors: Matthew Madiar, Bensenville, IL (US); Lavern Meissner, Charlotte, NC (US)

( * ) Notice: Subject to any disclaimer, the term of this patent is extended or adjusted under 35 U.S.C. 154(b) by 256 days.

(21) Appl. No.: 17/816,422

(22) Filed: Jul. 31, 2022

(65) Prior Publication Data
US 2024/0034404 A1    Feb. 1, 2024

(51) Int. Cl.
| | |
|---|---|
| *B62D 13/06* | (2006.01) |
| *B60W 30/18* | (2012.01) |
| *B60W 50/14* | (2020.01) |
| *B62D 15/02* | (2006.01) |
| *H04W 4/40* | (2018.01) |

(52) U.S. Cl.
CPC ....... *B62D 13/06* (2013.01); *B60W 30/18036* (2013.01); *B60W 50/14* (2013.01); *B62D 15/0275* (2013.01); *B62D 15/028* (2013.01); *H04W 4/40* (2018.02); *B60W 2050/146* (2013.01); *B60W 2300/14* (2013.01); *B60W 2420/403* (2013.01); *B60W 2556/45* (2020.02)

(58) Field of Classification Search
CPC .. B62D 13/06; B62D 15/0275; B62D 15/028; H04W 4/40; B60W 30/18036; B60W 50/14; B60W 2556/45; B60W 2050/146; B60W 2300/14; B60W 2420/403
See application file for complete search history.

(56) References Cited

U.S. PATENT DOCUMENTS

2022/0404829 A1*  12/2022  Nister .................. G05D 1/0212

\* cited by examiner

*Primary Examiner* — Michael D Lang
(74) *Attorney, Agent, or Firm* — Joseph Krause; Kelly & Krause, Ltd.

(57) ABSTRACT

Backing a vehicle around objects and vehicles is assisted by digitally mapping the location and size/footprint of objects and vehicles. A path for the vehicle to follow is generated by mathematically concatenating small segments of lines of various shapes iteratively, until a mathematical spline curve extending from the vehicle's starting point to a desired end point is generated, the shape of which will safely route the vehicle around objects. The starting and ending points of the spline curve, control points and inflection points are also mapped and wirelessly transmitted provided to a display device for the driver or to the vehicle's steering controls.

29 Claims, 8 Drawing Sheets

METHOD AND APPARATUS FOR DETERMINING A BACKUP PATH

BACKGROUND

As used herein the terms, backing and backing up, refer to driving a motor vehicle in a reverse direction. It is well known that safely backing a truck around obstacles in a parking lot or in a loading area to a desired destination or parking position can be difficult. When obstacles such as other vehicles surround or are even near a truck, backing it into a parking space often requires repetitive forward and backward truck movement accompanied by different steering wheel movements. A method and apparatus that helps a driver back a truck through a congested area in any parking lot and would help avoid collisions would speed truck deliveries and lower truck transportation costs, among other things.

DETAILED DESCRIPTION

The Problem to be Solved

Backing a truck or other vehicle into a parking space requires of course moving the vehicle backward, i.e., in a reverse direction. When there is no straight or substantially straight-line for the vehicle to follow into a parking space, as happens when the parking space is in a congested area, backing a vehicle into a space requires the vehicle be maneuvered around objects "in the way."

The Preferred Solution

When a vehicle is steered or maneuvered around obstacles in either direction, the vehicle's path will of course have at least one curve, simply because it is not possible for a steered vehicle's movement around an object to be discontinuous, i.e., vehicles cannot be simply lifted off the ground, rotated and lowered back down. A steered vehicle's path forward or backward around an object will therefore always be continuous and include one or more curved segments. Stated another way, a non-linear path of a steered vehicle around an object will always have some curvature, somewhere along the length of the path. A steered vehicle's path around objects can thus have both linear and curving segments.

Spline Curves

Backing a vehicle into a parking space can be assisted by informing a vehicle's driver, or an autonomous driving system for the vehicle, when and how far to adjust the vehicle's steering wheel or steering mechanism as the vehicle moves so that the vehicle will follow a smooth, curving line from a starting location backward toward and into a desired ending location and that will route the vehicle around obstacles the driver cannot see.

Shapes, including geometric shapes, are considered herein to be any structure, open or closed, having a definite shape and properties, made up of lines, curves and points. Some of the known geometric shapes are square, rectangle, circle, cone, cylinder, sphere, etc. All these shapes have specific properties that make them unique and different from the other shapes Shape thus includes figures closed by a boundary which is made by combining curves, points, and line segments. Each shape has a unique name such as circle, square, triangle, rectangle, The shapes of mathematical ellipses, parabolas, sines and catenaries are smooth curving lines. They cannot always be perfect mathematical functions, i.e., well-shaped, per se when they are used to model or represent a path or route for a vehicle to follow around an obstacle, partly because none of them have inflection points, i.e., a direction change, which a vehicle is frequently required to do in order to get around an object because of a vehicle's physical characteristics. A third or higher-order polynomial equation can define a smooth, curving line with direction changes/inflection points, but few vehicle parking paths will conform to the shape of a particular third or higher-order polynomial per se, at least in part because particular coefficients of a third or higher-order polynomial equation that will generate a desired path's shape, are quite difficult to determine. A spline curve, as defined below, is therefore a preferred curve or shape of a path for a vehicle to follow backwardly from a starting location to a desired ending location and avoid obstacles between the starting and ending locations.

As used herein, a mathematical spline curve, also referred to herein interchangeably as a spline curve or simply a spline, is a smoothed and curving line, shaped as needed to define or represent a path for a particular vehicle to follow between two end points of the spline curve and which can wrap around obstacles between those end points. A spline curve can also have one or more inflection points, i.e., points where the curve changes its direction (also a point on a spline where the slope of a line tangent to the spline at that point, changes its polarity) in order to provide a path through or around objects. A spline curve is thus the preferred type of curve to represent a path for a vehicle to follow in order to back the vehicle around obstacles between a starting point to an end point, because it can be virtually any shape.

Merriam Webster's Collegiate Dictionary defines a spline as a function on an interval, which approximates a mathematical function and is composed of pieces of multiple simple functions defined on subintervals, joined at their endpoints with a suitable degree of added smoothness. Stated another way, a spline or spline curve is composed of multiple pieces of different mathematical functions. A smooth curve having virtually any shape can thus be constructed by joining the ends of multiple different functions together, i.e., concatenating the segments of functions, to provide a curve for a vehicle to follow around objects. Straight lines, segments of circles, segments of parabolas, and segments of ellipses can all be defined and represented by corresponding mathematical functions evaluated between two values.

A spline or spline curve is therefore considered herein to be one or more segments of mathematical functions, which can be simple curves, complex curves and line segments, each segment being defined by corresponding mathematical functions, at least two of the functions being different from each other. The segments and their characteristics are selected as needed such that when the segments are concatenated, i.e., joined to each other at their end points, the resultant line will extend between two separated points or locations and go around obstacles that prevent a straight line from extending directly between those same two separated points.

Figures 1A, 1B:
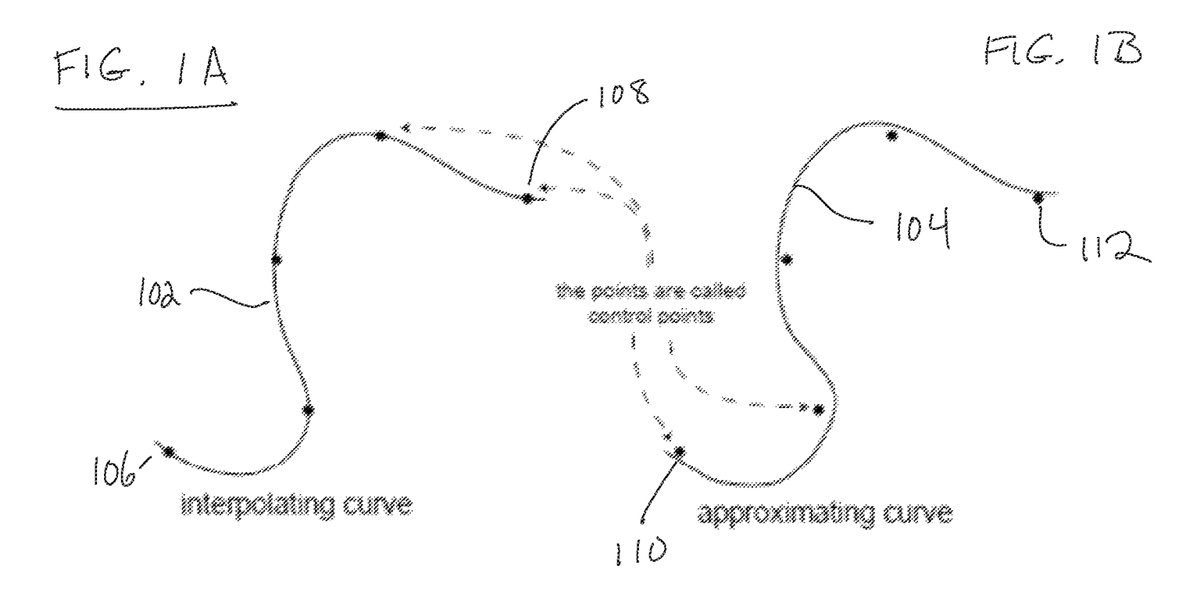
FIG. 1A depicts an interpolating spline curve.
FIG. 1B depicts an approximating spline curve.

The opposing ends of segments of a spline curve are joined to each other at control points. A spline curve that passes through each control point is called an interpolating curve; a spline curve that passes near but not through control points is called an approximating curve. FIG. 1A depicts an interpolating spline curve 102. FIG. 1B depicts an approximating spline curve 104. Both spline curves 102, 104 have shapes suited to represent a route or path for a vehicle to follow around obstacles that would obstruct a straight line between the curves' end points, 106 and 108 and 110 and 112 respectively.

Spline Curves in a Constrained Environment on an Occupancy Grid Map.

A Cartesian coordinate system is well known to be a planar, i.e., two-dimensional coordinate system in a geometric plane in which every point or location in the plane can be specified or identified by a pair of numerical coordinates. A pair of coordinates uniquely identifies a point in the plane relative to two fixed perpendicular (orthogonal) oriented lines measured in the same unit of length. Each reference line in a Cartesian coordinate system is referred to interchangeably as either a coordinate axis or simply an axis of the system. The point where the two orthogonal axes meet is defined as the coordinate system's origin. The numerical coordinates where the two orthogonal axes meet are the well-known ordered pair (0, 0). The coordinates of any point in the plane relative to the ordered pair (0, 0) can therefore be defined by ordered pairs because they define positions of the perpendicular projections of a point onto the two orthogonal axes expressed as signed distances from the origin.

Figure 2:
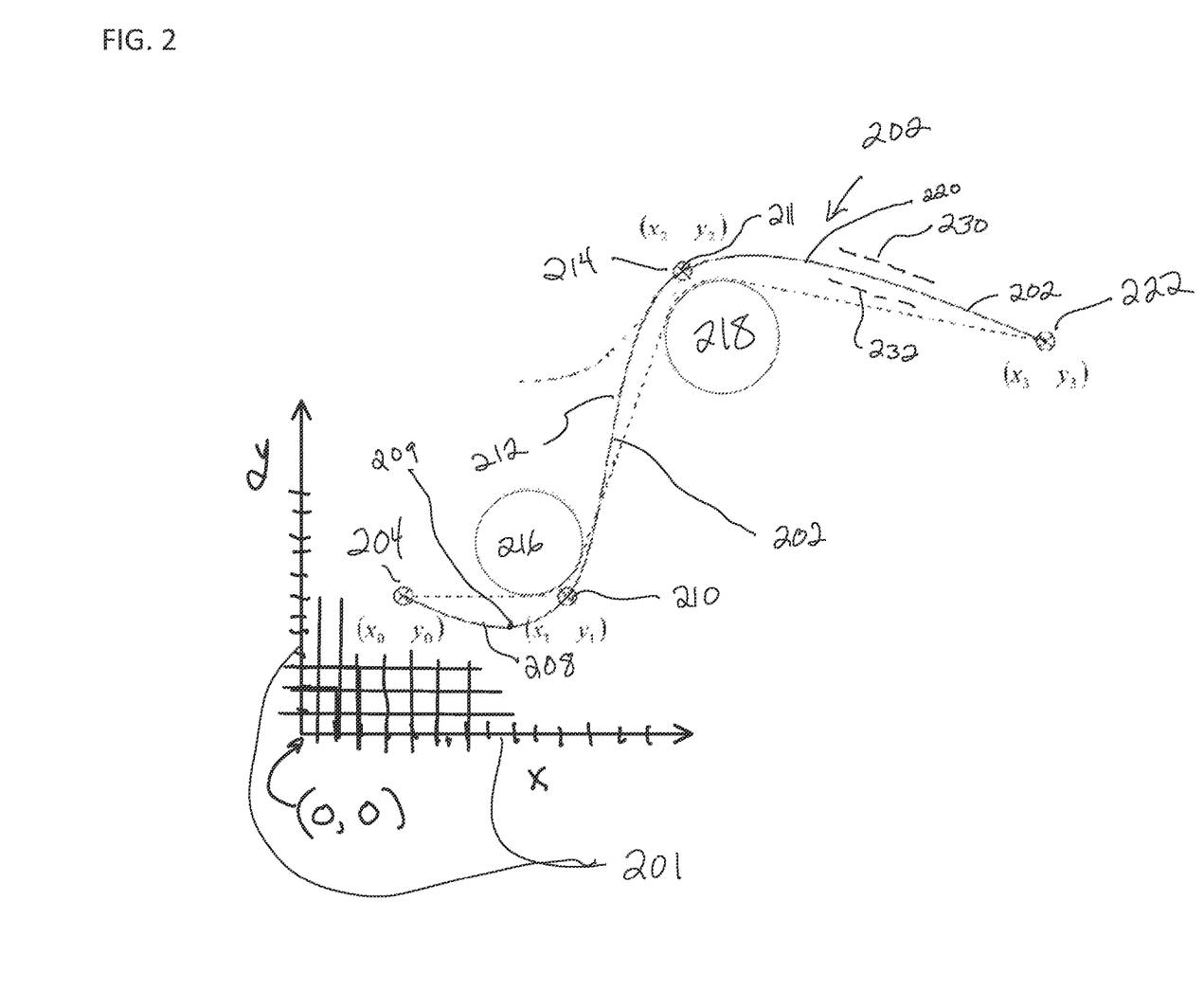
FIG. 2 depicts a spline curve, as defined below, which wraps around objects and has a substantially serpentine shape.

FIG. 2 represents another example of a spline curve 202 the shape of which is somewhat serpentine or boustrophedonic, i.e., alternating in opposite directions, between two end points 204, 222, which are also considered herein to also be spline curve control points. As described below, the spline curve 202 in FIG. 2 is generated (or created) by a mathematically fitting the curve 202 "on top of" a Cartesian coordinate system 201 such that the curve 202 avoids, i.e., extends around obstacles 216 and 218. Reference numerals 209 and 211 identify inflection points.

For illustration purposes, the origin (0, 0) and the perpendicular axes of the coordinate system 201 depicted in FIG. 2 and are located in FIG. 2 at the figure's lower-left corner. The locations of the control points and sequences of geometric points of the spline curve 202 on the coordinate system 201 are located on the system 201 by their respective coordinates.

A first sequence of adjacent geometric points on the Cartesian coordinate system define a first curved line segment 208 extending between the first control point 204 located at $x_0$, $y_0$ and a second control point 210 located at $x_1$, $y_1$. A second sequence of points define a second curved line segment 212 extending from the second control point 210 to a third control point 214 located at $x_2$, y2. The first spline curve 202 segment (curved line segments 208 plus 212) between the first control point 204 through the second control point 210 to the third control point 214, avoids or "wraps" around an obstacle represented in FIG. 2 by a circle identified by reference numeral 216. A third sequence of points define a third curved line segment 220 extending from the third control point 214 located at $x_2$, y2 to an end point 222, which is also a fourth control point. FIG. 2 thus represents a spline curve 202 that extends between two end points 204, 222 located at corresponding coordinates $x_0$, $y_0$ and $x_3$, $y_3$ on a geometric plane, but which also goes around or avoids two obstacles 216, 218, which are located at their own corresponding coordinates, $x_1$, $y_1$ and $x_2$, y2 on the same geometric plane.

In the preferred embodiment, a spline curve representation of a path that a vehicle can follow in order to safely avoid objects in a constrained environment comprises steps that include: 1) mathematically generating circles of varying diameters, or mathematically generating shapes of other mathematical functions, on an occupancy grid map representation of the constrained environment and overlaying, i.e., mathematically superimposing, the generated circles onto a Cartesian coordinate map, conceptually above or beneath the constrained environment; 2) mathematically constructing a path on the Cartesian coordinate map, that will extend at least part way between a vehicle's "current" location on the Cartesian coordinate map to a desired ending location on the map by joining or concatenating selected segments of generated circles of possibly different diameters, at end points of the selected segments; and 3) joining end points of selected segments of generated circles on the Cartesian coordinate system map with segments of other functions such that when the segments are joined and "superimposed" onto the Cartesian coordinate system, they form a smoothed, curving line is formed on the Cartesian coordinate system map extends between the vehicle's current location and a desired ending or final location on the map, which if followed by the vehicle, the vehicle will travel from its current location on the map to a desired ending location on the map without a collision.

As used herein, the term loading dock refers to an individual platform to which a truck or other vehicle connects to or with, in order to load or unload the truck or other vehicle. Loading bay refers to an indoor or outdoor area having one or more loading docks.

A box truck, also known as a box van, cube van, bob truck or cube truck, is considered herein to be a single-frame truck with an enclosed cuboid-shaped cargo area and a cab. The cargo area and the cab are attached to the same frame. An articulated truck is a truck with a permanent or semi-permanent pivot joint to which a trailer can be pivotally attached, allowing the truck and attached trailer to turn more sharply. Tractor-trailer refers to an articulated truck consisting of a semi-tractor and a trailer, with the trailer pivotally attached to the semi-tractor. The pivot joint of a semi-tractor is known to some in the art as a king pin.

Backing a Truck Through a Loading Bay

Figure 3:
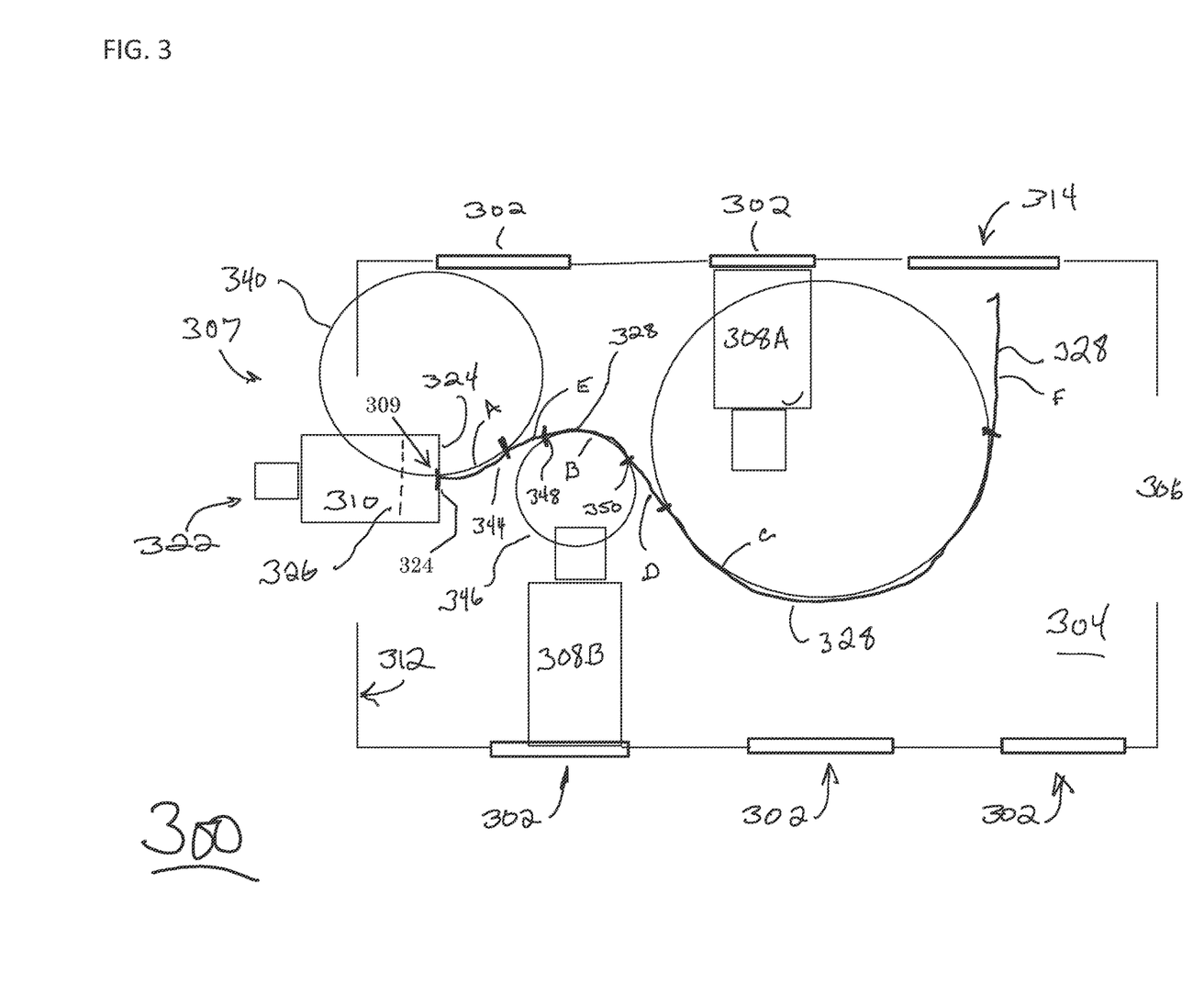
FIG. 3 is a plan or top view of a loading bay having multiple loading docks on opposite sides of the loading bay lane and a spline curve for a truck to follow backwardly to a loading dock.

FIG. 3 is a plan or top view of a loading bay 300 having multiple loading docks 302 on opposite sides of a lane 304 having two opposing openings 306 and 307. Vehicles can enter and leave the bay 300 and access loading docks 302 through two openings 306 and 307 at opposite ends 304, 312 of loading bay 300. Two trucks 308A and 308B are shown parked at loading docks 302 on opposite sides of the lane 304.

A truck to be docked 310 at a loading dock 314 in the bay 300 is shown located at a starting or initial location 309 that is near or proximate bay opening 307. The lengths of the particular trucks 308A and 308B, and their extensions into the lane 304, are such that those trucks' extensions into the lane 304 require that the truck 310 follow a curving path 328 around them in order to avoid colliding with them. (One or more different trucks with different extensions parked in the same or different locations might require a differently-shaped path.) The smooth curving path 328 through the bay 300 to back the truck 310 to the loading dock 314 is thus represented a corresponding smooth, curving line 328, i.e., a spline curve, extending from the rear or back end 324 of the truck 310 to the loading dock 314. The spline curve 328 thus has a first or starting location 309 and a second or ending location, which is the dock 314.

For illustration and explanation simplicity purposes, the truck in FIG. 3 to be parked 310 is not articulated, i.e., it is not a trailer coupled to a tractor. The truck 310 has a front end 322 and a rear end 324. The rear end 324 is to be parked against a loading dock 314 near the opposite end 306 of the bay 300. The truck 310 is also represented as having a single rear axle 326.

When the truck is backed through the bay 300 so that the rear end 324 follows (or at least substantially follows) the spline curve 328, the truck's rear end 324 will safely reach the loading dock 314, i.e., the truck 310 will avoid objects in the bay 300 and reach the loading dock 314 without a collision.

The spline curve 328 is generated to have a shape the truck 310 can follow safely to the loading dock 314. The particular shape of the depicted spline curve 328 is responsive to several factors, including the size of and location of the truck 310, its maneuvering characteristics, the size and shape or "footprint" of objects in the bay 300 and their locations and spacing relative to each other, relative to the starting location of the truck 310 and relative to the final or destination that the spline curve 328 must reach.

Vehicle maneuvering characteristics include but are not limited to a vehicle's wheel base, axle count, tire size, turning radius and vehicle width. And as used herein, a turning radius is considered to be one-half of a vehicle's turning diameter. Turning diameter is considered herein as the minimum diameter (or "width") of available space required for a vehicle to make a circular turn, i.e., a complete, 360-degree "turn", which the truck will make when the vehicle's steering is rotated to the limit of its travel in either clockwise or counter-clockwise direction. -turn. Turning diameter thus refers to a theoretical minimal circle diameter in which a vehicle can be "turned around," i.e., turned or rotated by 360 degrees. The tightest turning circle possible for a vehicle is the circle the vehicle follows either forwards or backwards while turning and which effectively simply rotates the vehicle on its own axis.

In the preferred embodiment, a spline curve 328 is generated to have a shape, such that a truck having the particular maneuvering characteristics as the truck 310 to be parked, will go around objects in the bay 300 without collisions when the truck 310 travels backwardly, if the truck travels backward following or at least substantially following the path of the spline curve 328, starting at the curve's starting location 309 up to the curve's ending location 314. The method and apparatus disclosed and claimed herein thus refer to determining and providing steering guidance to either a driver or an autonomous driving system required to back (move or drive the vehicle in reverse) so that the vehicle can be safely moved around obstacles backwardly from a first or starting location to a second or final location.

Backing a truck so that the rear end 324 follows or at least substantially follows the spline curve 328, requires the truck's steerable wheels be turned through various angles as the truck is moved backwardly from its starting location 309 to the desired ending location 314. Steerable wheel movements required to safely move the truck 310 along the spline curve 328 backwardly will vary according to the truck's maneuvering characteristics. The spline curve's shape is therefore generated using (responsive to) maneuvering requirements and steering characteristics of the truck simply because a truck or other vehicle cannot follow a curve having a shape, which the truck or vehicle is physically incapable of following.

Generating and Fitting a Spline Curve

A constrained environment is considered herein to be a finite area, the sides or perimeter of which is bounded. In an alternate embodiment, a constrained environment can also be a three-dimensional volume. In either embodiment, a vehicle within a constrained environment should be steered or maneuvered within the boundaries of the constrained environment to avoid collisions with objects in the constrained environment, as well as the constrained environment's boundaries.

A constrained environment can include objects and barriers. A constrained environment can also include movable objects such as parked vehicles. Some constrained environments can have objects that move, such as a moving vehicle or a person. A parking lot is an example of a constrained environment. A warehouse is an example of a three-dimensional volume, which can also be a constrained environment. The loading bay 300 of FIG. 3, which is in a parking lot, is a constrained environment.

As used herein the term footprint refers to an area or volume occupied by or affected by an object, regardless of whether the object's shape is regular or irregular.

An occupancy grid map is considered herein to be a mapping of the coordinates of locations and coordinates of footprints of objects within a constrained environment onto a Cartesian coordinate system, which is conceptually imposed on, wrapped around or overlaid on the constrained environment. An occupancy grid map is thus one or more sets of (x, y) or Cartesian coordinates of boundaries or footprints of objects in a constrained environment, sets of (x, y) coordinates of a two-dimensional constrained environment's boundaries also being on the same Cartesian or 3-dimensional rectilinear coordinate system or three-dimensional coordinates. Locations, volumes and footprints of objects in a constrained environment, and the constrained environment boundaries are thus specified by sets of coordinates on a 3D-rectilinear coordinate system.

The size or area of a rectilinear object's footprint requires at least four pairs of coordinates on the Cartesian coordinate system, i.e., a pair of coordinates for each corner of a rectangle. The size or area of a circular object's footprint will require a pair of coordinates for the center of a circle and several pairs of coordinates for several points located on and around the circle's perimeter, the number of which is a design choice. The area of an irregularly-shaped object will also require several pairs of coordinates, depending on the object's shape.

Creating or generating the spline curve is accomplished in part using modified circle packing in that, unlike prior art circle packing, the modified circle packing includes generated circles that can overlap other circles. Using the modified circle packing, segments of circles, regardless of whether the generated circles overlap, can be connected together by segments of other mathematical functions, e.g., ellipses, parabolas, trigonometric functions or hyperbolic trigonometric functions. In the preferred embodiment, a spline curve between a vehicle and a desired destination or location in a constrained environment, is generated by a processor iteratively by:

(1) Overlaying, i.e., mathematically superimposing, geometric circles of varying diameters onto the constrained environment's occupancy grid map representation of a constrained environment, each circle having a corresponding radius with at least some of the circles being at least partly within the constrained environment; and (2) Mathematically concatenating, i.e., mathematically joining together, opposing ends of segments overlaid circles and segments of other mathematical functions, which when they are connected, they form at least part of a smooth, curving line that extends from a first or starting location to, or least part way toward, a second or desired final or ending location, and which avoids obstacles in the constrained environment and provides sufficient side-to-side margins (separation space on each side) also sometimes referred to as a "cost map" or "swept path" for the particular vehicle or truck to be physically able to safely follow the generated line through the constrained environment; or alternatively (3) In instances when overlaid circle segments are too far apart to be connected directly to each other without introducing unnecessary inflection points or unacceptable curvatures but nevertheless require joining, segments of other mathematical functions are used to join circle segments the result of which is nevertheless a spline curve, such as the spline curve 202 depicted in FIG. 2.

Figure 4A:
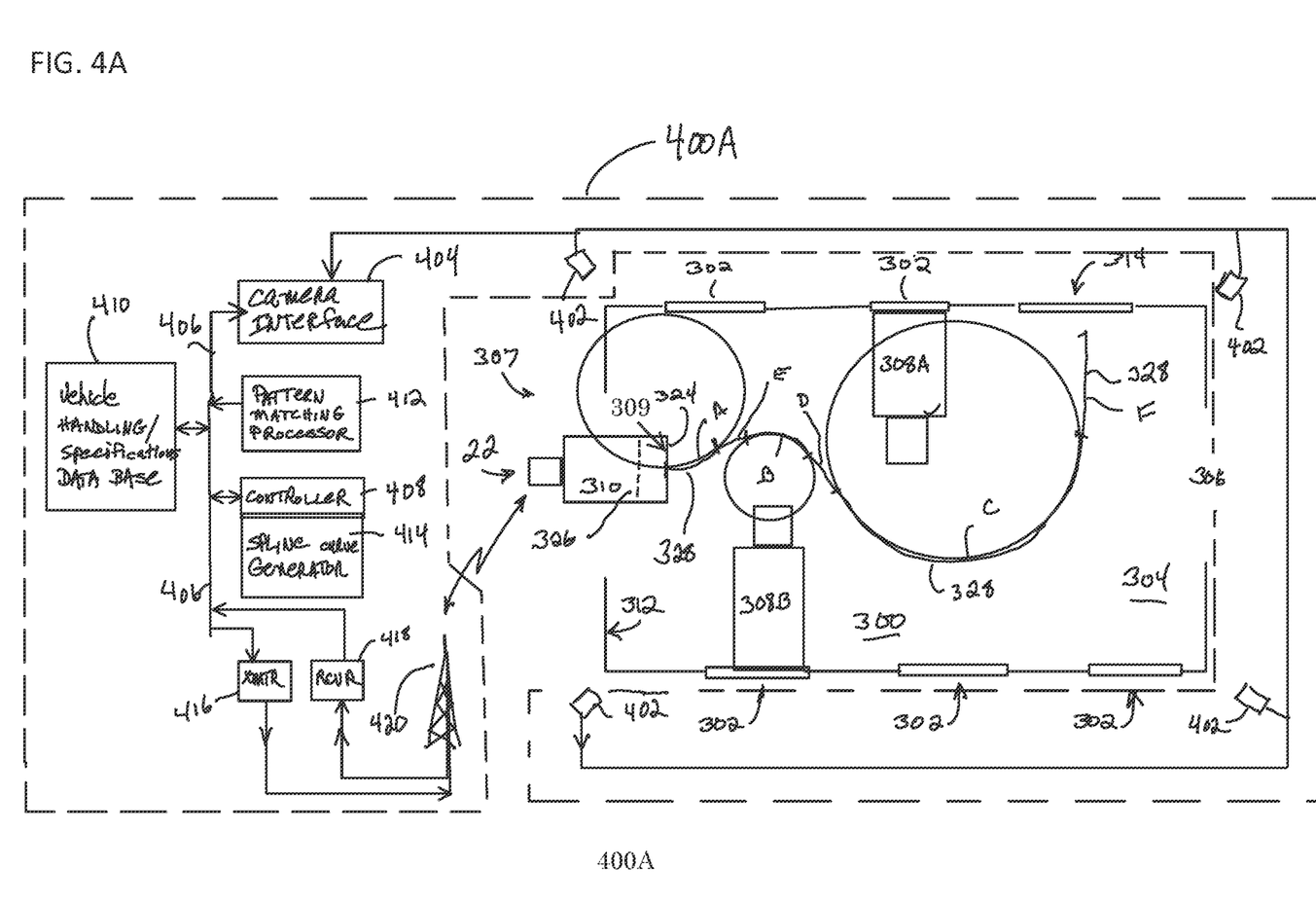
FIG. 4A depicts a first apparatus embodiment for wirelessly providing steering guidance to a vehicle.
Figure 4B:
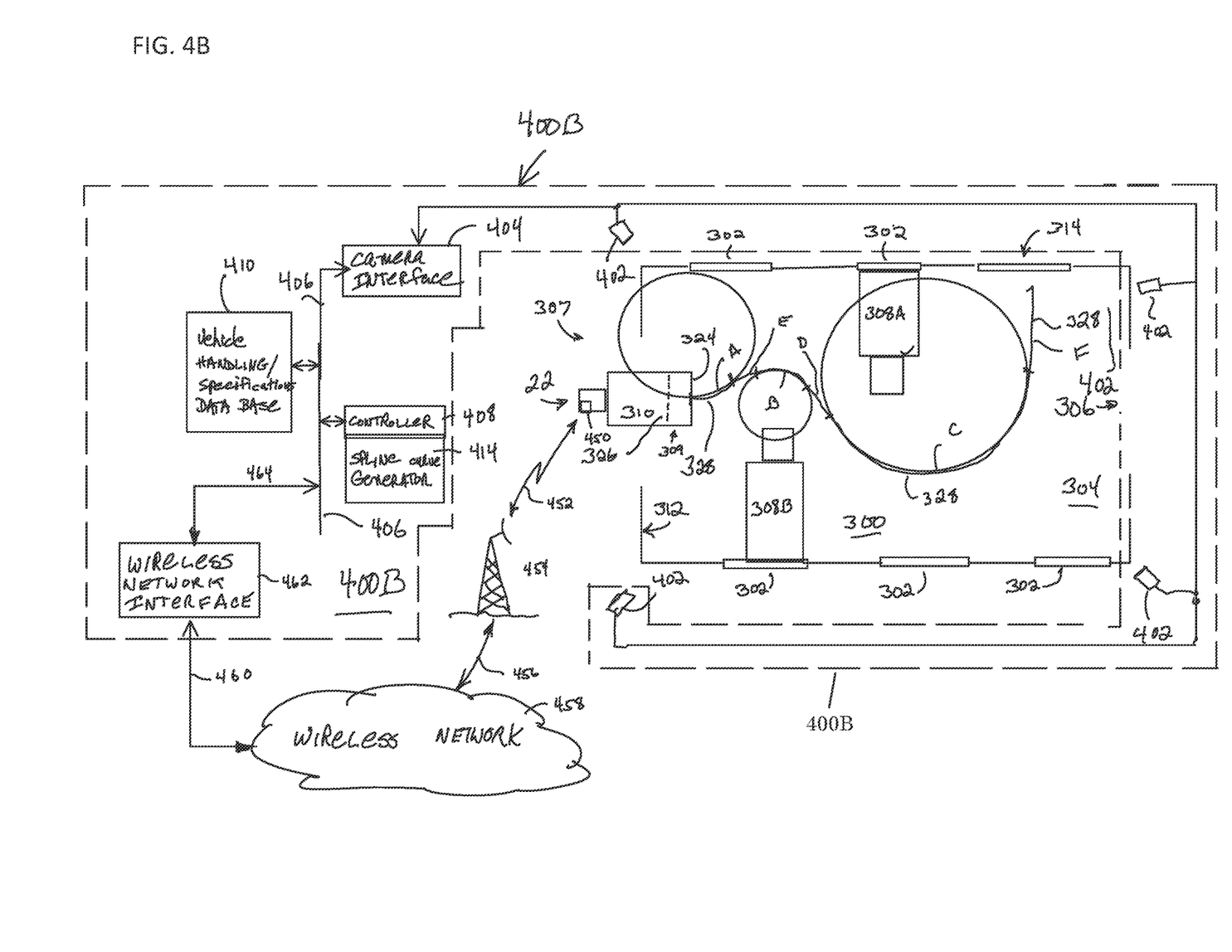
FIG. 4B depicts a second apparatus embodiment for wirelessly providing steering guidance to a vehicle.

In FIG. 3, FIGS. 4A and 4B, the spline curves 328 comprise segments of overlaid circles the ends of which are joined by what appear to be straight or substantially straight lines but which could also be short segments of other functions such as functions for circles, parabolas, trigonometric functions, hyperbolic trigonometric functions, exponential functions, ellipses or straight lines, all of which are of course mathematical functions. Regardless of their precise nature, their concatenated segments form a smooth, curving line 328, which goes around objects as it extends from a first or starting location to or least part way to a second or desired final or ending location and provides sufficient side-to-side margins (separation space on each side) for the particular vehicle or truck to be physically able to safely follow the generated line through the constrained environment.

In FIG. 3, reference letter "A" identifies a segment of a first circle 340, the end points of which are identified by reference numerals 342 and 344. Reference letter "B" identifies a different segment of a different, second circle 346, the end points of which are identified by reference numerals 348 and 350.

The diameters of the two circles 340 and 346 are different. Their different diameters, and corresponding radii, allow particular segments of those circles to be identified as part of a path around the truck identified by reference numeral 308B when those two segments are joined by an intermediary segment, "E".

The end point 344 of the first segment A of the first circle 340 is joined or connected to the closest end point 348 of the segment B of the second circle 348 by a "line" segment identified by reference letter "E". A particular mathematical function that defines the shape of segment "E" in FIG. 3 is not discernible to the naked eye simply because end points 344 and 348 in FIG. 3 are too close to each other to permit visual identification of the particular shape of the segment as being generated by a particular mathematical function. Stated another way, it is not possible to discern from FIG. 3 whether the mathematical function represented by segment "E" is a circle, ellipse, parabola, straight line a third or higher-order polynomial, simply because segment "E" is too short to identify.

Commonly-used terms, margin, "cost map" and "swept path" all refer to the space on one or both sides of a generated spline curve that a particular vehicle with its particular maneuvering and physical characteristics needs to be able to safely, i.e., without collision, move through a constrained environment. In FIG. 2, reference numerals 230 and 232 represent margin boundaries for spline curve 202. In FIG. 3, discernable margin boundaries of spline curve 328 are omitted for illustration clarity purposes.

The spline curve (or other smoothened and curving line) and required margins are generated by a controller or processor that receives real-time images of a confined area, i.e., a constrained environment from cameras directed into the constrained environment and objects therein, including a truck to be backed from a first location to a second location. Fixed objects in the constrained environment, their Cartesian coordinate locations and sizes, are identified by pattern matching captured images of them, to reference images stored in a database or by providing physical location and characteristics information to the processor. Vehicles for example can provide their Cartesian coordinate locations, their physical and maneuvering characteristics to the processor via an appropriate wireless network extending between at least the constrained environment and the processor. In either case, maneuvering requirements and steering characteristics of a vehicle are also provided to the processor.

After the processor receives or is provided Cartesian coordinate data for the constrained environment and real-time data for vehicles and obstacles in the constrained environment, a smoothened curve (with required margins) is generated to route a vehicle through the constrained environment and avoid or avoid objects in the constrained environment which would obstruct a vehicle moving from its first location to a desired second location.

In the preferred embodiment, after a spline curve through the constrained environment for the vehicle to follow is generated, data from which a real-time graphical representation of the constrained environment and the generated spline curve can be presented on an in-vehicle display device, is wirelessly transmitted to the truck where it is received and processed for display to the driver in real time. In an alternate embodiment, after a spline curve through the constrained environment is generated, data by which a steering mechanism of an autonomous vehicle can be controlled to maneuver the vehicle through the constrained environment is wirelessly transmitted to the truck where it is received and provided to the vehicle's steering mechanism as steering guidance data.

Figure 5A:
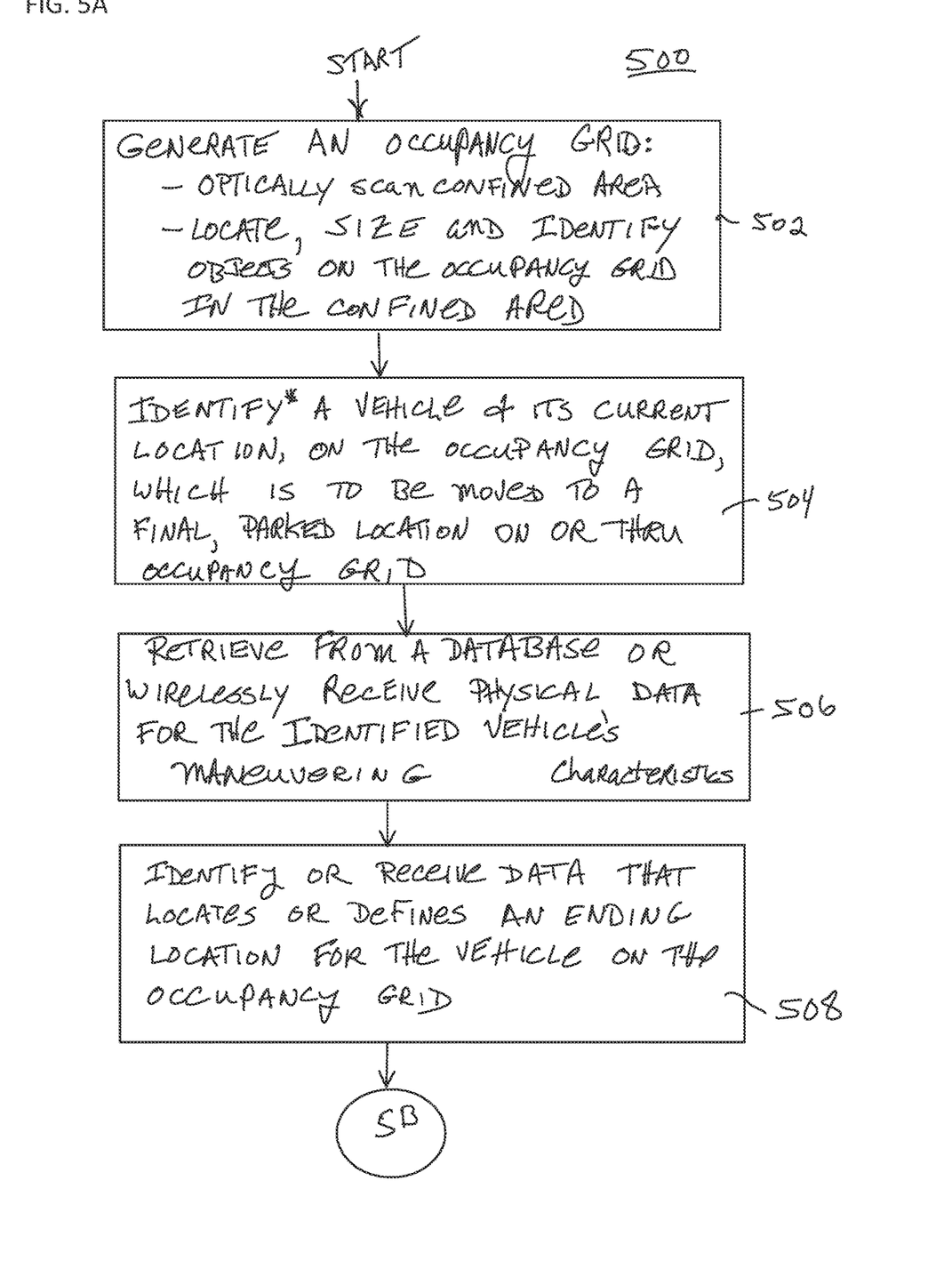
FIGS. 5A-5C, depict steps of a method by which a spline curve is generated for an identified vehicle needing to backed into a parking space in a constrained environment, such as the loading bay depicted in FIG. 3.
Figure 5B:
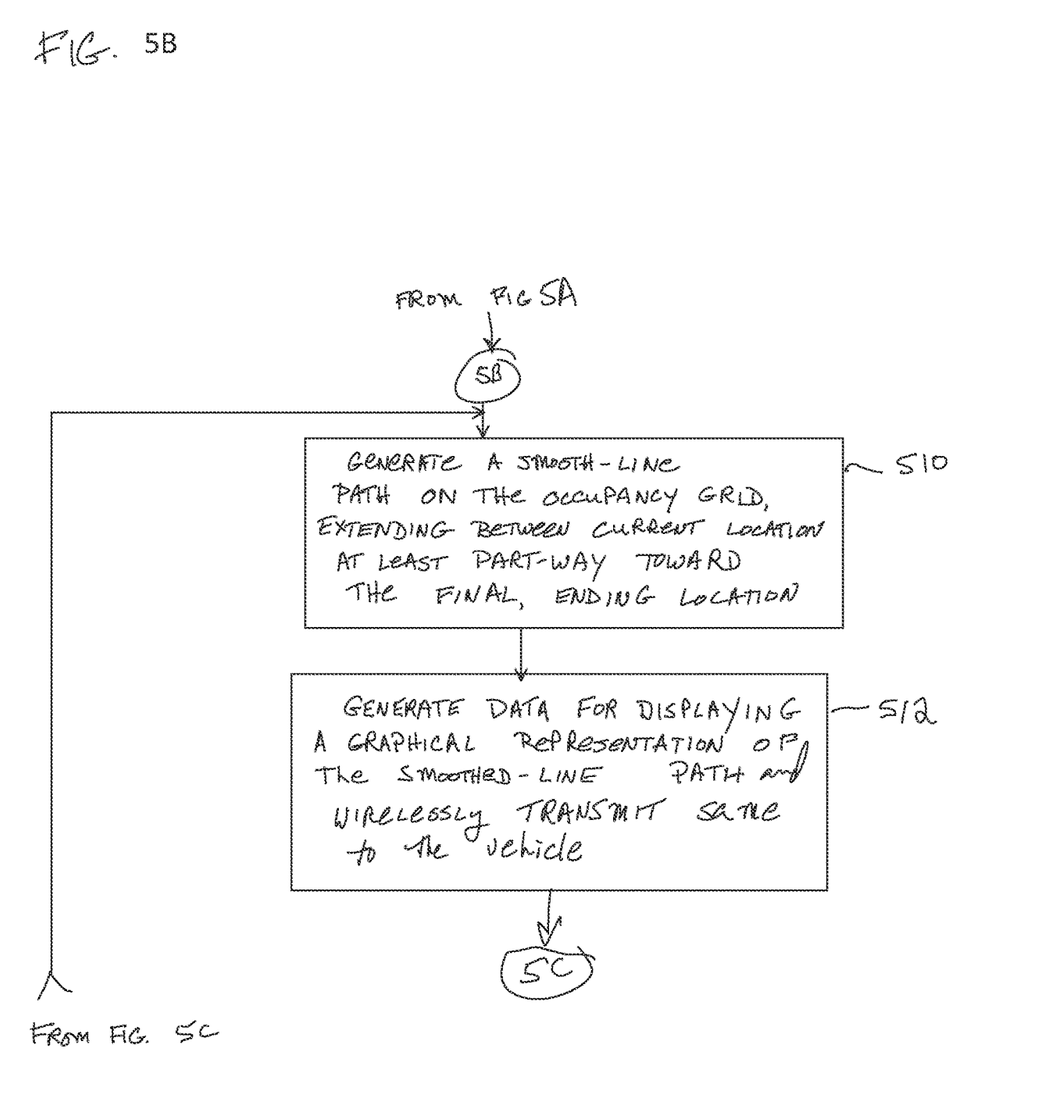
Figure 5C:
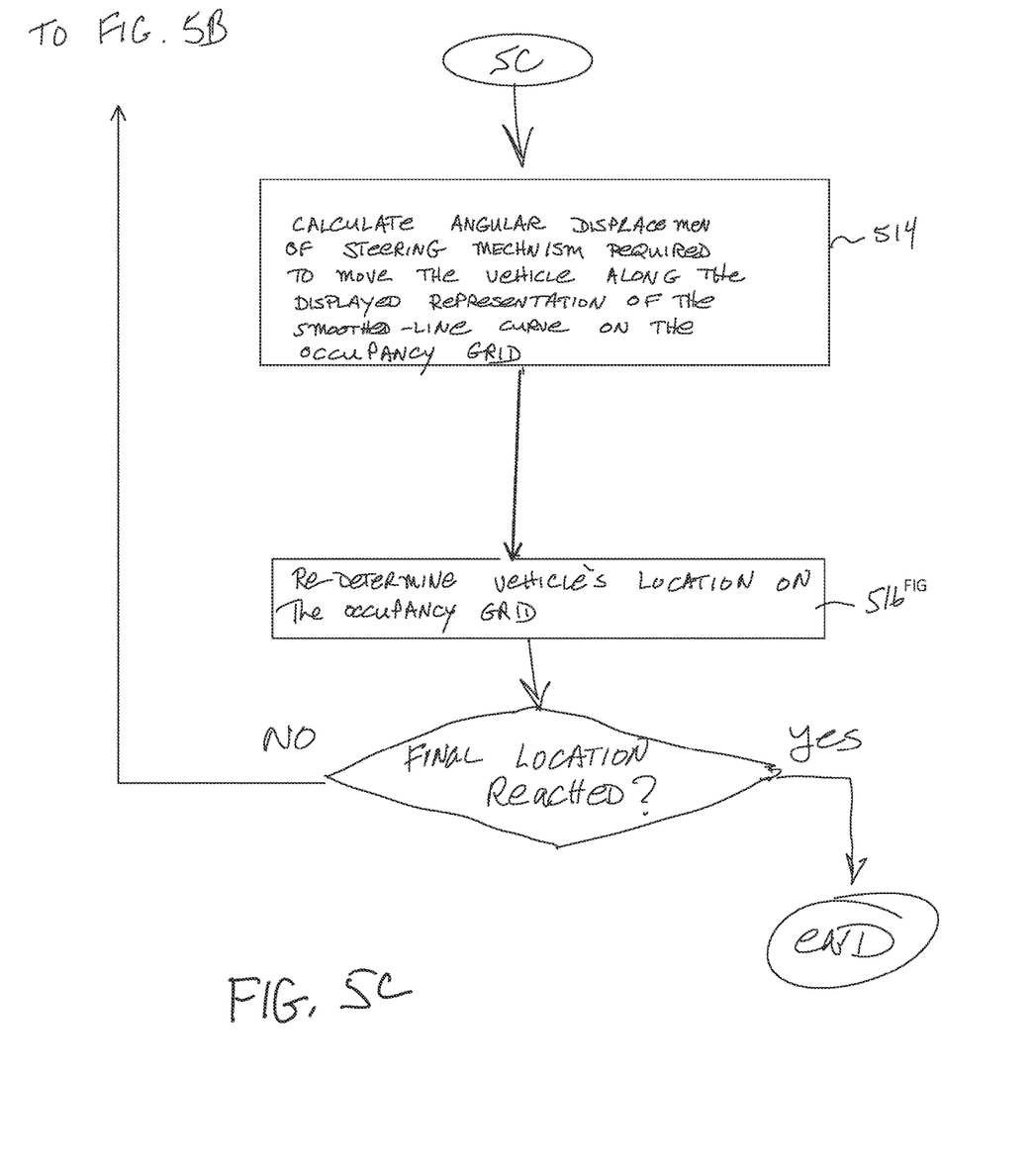

FIG. 4A depicts a first embodiment of an apparatus 400A for providing steering guidance or in an alternate embodiment, generating images on a vehicle-located display device, by which a vehicle can be safely driven backward through a constrained environment. FIGS. 5A, 5B and 5C show steps of a method for providing steering guidance required to move a vehicle through a constrained environment from a starting location toward a final or ending location.

In FIG. 4A, digital cameras 402, which are preferably high resolution (HD "1080p" or better) and preferably stereoscopic, are coupled to an address/data/control bus 406 of a processor, also known as a controller 408 as shown in the figure, which controls the cameras to capture images of objects in the constrained environment embodied as the loading bay 300. The digital images captured by the camera 402 include information by which the relative size, footprint and location of objects in the loading bay 300 can be derived by the processor 408 and specified by their Cartesian coordinates in the constrained environment/loading bay 300. Stated another way, the information from the digital cameras 402 and which is obtained by the processor 408, provide an occupancy grid map of the constrained environment/loading bay 300 and its contents by digitally scanning the loading bay 300 and locating, sizing and identifying objects in the loading bay 300 onto an occupancy grid map that is conceptually overlaid the loading bay 300, such as the Cartesian coordinate system shown in FIG. 2.

Still referring to FIG. 4A, the apparatus 400A also comprises a pattern matching processor 412, which is operatively coupled to a vehicle handling and specifications data base 410 via the system bus 406. The data base 410 stores digital representations of images of known vehicles. By way of example, in the preferred embodiment, the data base 412 stores, front views, back views, left and right-side views, top-views and perspective or isometric views of vehicles, i.e., automobiles, box trucks and articulated trucks typically as well as front views, back views, left and right side views, top-views and perspective or isometric views of trailers that can be coupled to a tractor and which form an articulated, tractor-trailer combination. The preferred embodiment of the data base 410 also stores vehicle maneuvering-related data, which typically comprises wheel base, wheel diameter, tire diameters, turning diameter/radius, vehicle size, wheel tread width, axle count, side clearance requirements, i.e., margin size, king pin locations and the like.

Pattern matching per se is well known to those of ordinary skill in the art. In the preferred embodiment, a vehicle 310 in the bay/constrained environment 300 is identified by comparing images of the vehicle 310 captured by the cameras 402, to corresponding images of vehicles stored in the data base 410. The make, model, size, shape and maneuvering characteristics of the vehicle 310 are thus identified by the pattern matching processor 412 matching camera-captured images to images stored in the vehicle handling and specifications data base 410.

By identifying a vehicle, its maneuvering characteristics and physical characteristics such as lateral spacing requirements or margins required by the identified vehicle and which are necessary for it to safely move through the bay 300 are obtained from the data base 410. The location of the identified vehicle 310 and its footprint are thereafter mapped to Cartesian coordinates in the bay 300. The identity, locations and characteristics of other objects in the bay/constrained environment, e.g., the parked trucks 308A and 308B, are determined and mapped onto the same Cartesian coordinate system by their Cartesian coordinates using digital image capture and pattern matching.

After the vehicle 310 and objects surrounding it in the bay/constrained environment 300 are identified, a spline curve is generated by the spline curve generator 414, which in the preferred embodiment is set of program instructions for the controller 408. Those instructions cause the controller 408 or other processor to iteratively perform the steps described above and as those steps are shown in FIGS. 5A-5C.

As used herein, "real time" refers to the actual time during which something takes place. In the preferred embodiment, the method of generating a spline curve to go around objects in the constrained environment is repeated iteratively as the vehicle 310 moves toward a destination such that the shape of the generated spline can change in real time (or substantially real time) in response to changes in the vehicle's location caused by a driver or autonomous-vehicle steering anomalies or aberrations, or as objects in the constrained environment might change or as the system-determined location of the vehicle 310 or the system-determined footprints of objects in the constrained environment might change.

Still referring to FIG. 4A information, i.e., digital data, representing coordinates of the generated spline curve's shape, are provided by the controller 408 to a radio frequency transmitter 416 via the same bus 406 that connects all of the different system components together. The information representing the generated spline curve's shape is thereafter broadcast from an antenna 420 into the loading bay/constrained environment 300. That information is then provided to either the vehicle's autonomous driving system (not shown) or to an in-vehicle display device/user interface (not shown) by which the vehicle can either steer itself backwardly to the loading dock 314 or instructions or images can be provided to a driver by which the drive can safely back the vehicle along a spline curve to the loading dock 314.

The system in FIG. 4A thus wirelessly broadcasts data into a constrained environment from which representations of necessary steering guidance can be provided to the vehicle and by which a vehicle's movement will substantially conform to a smoothed curving line path's shape required to move the vehicle toward the final ending location.

FIG. 4B depicts a second and alternate embodiment of an apparatus 400B for providing steering guidance, or in an alternate embodiment, generating images on a vehicle-located display device and by which a vehicle can be safely driven backward through a constrained environment. FIGS. 5A, 5B and 5C show the steps of a method for providing steering guidance required to move a vehicle through a constrained environment from a starting location toward a final or ending location.

The embodiment shown in FIG. 4B includes the high-resolution (preferred by not essential) digital cameras 402 shown in FIG. 4A, which are also coupled to the address/data/control bus 406 of the processor 408 and which controls the cameras to capture images of objects in the constrained environment embodied as the loading bay 300. The digital images captured by the cameras 402 include information by which the relative size, footprint and location of objects in the loading bay 300 can be derived by the processor 408 and specified by their Cartesian coordinates in the constrained environment/loading bay 300. Stated another way, the information from the digital cameras 402 and which is obtained by the processor 408, provide an occupancy grid map of the constrained environment/loading bay 300 and its contents by digitally scanning the loading bay 300 and locating, sizing and identifying objects in the loading bay 300 onto an occupancy grid map that is conceptually "beneath" the loading bay 300, such as the Cartesian coordinate system shown in FIG. 2.

Instead of identifying vehicles by pattern matching, the system of FIG. 4B receives vehicle handling and maneuvering data from the vehicle requesting backing assistance rather than by pattern matching. The system of FIG. 4B thus comprises a wireless network interface 462, which is operatively coupled to a vehicle 310 requiring backing assistance through a wireless communications network 458 that is linked or coupled to the vehicle 310 by a wireless communications link 452 extending between the vehicle 310 and the wireless telecommunications network 458.

A bus 464 extends from the wireless network interface 462 to the system bus 406. Information/data obtained or received from a radio 450 in a vehicle 310 in the loading bay 300 is thus provided to the system bus 406 using the wireless network 458 rather than being determined from pattern matching and a database.

Maneuvering characteristics and physical characteristics information that pertain to the truck 310 are sent "directly" to the controller 408 and spline curve generator 414, expediting the creation of spline curves. The vehicle's 310 maneuvering and physical characteristics can be stored within radio 450, which is part of the truck 310.

After a spline curve is generated by the spline curve generator 414, data from which a generated spline curve can be viewed on a display device located in the truck 310 is wirelessly "sent" back to the truck 310, i.e., transmitted or broadcast into the constrained environment, through the wireless network.

For claim construction purposes, the wireless network 458 in FIG. 4B can be a prior art cellular telephone network. In such an embodiment, the radio 450 in the vehicle 310 and the wireless network interface are of course "cellular" devices. The transmission of image data sent to the truck 310 by the cellular network interface 462 and the spline curve generator 414, is thus considered herein as causing or effecting the wireless data broadcast performed by the cellular network, which is of course a wireless communications network.

Those of ordinary skill in the art should recognize that the radio communications depicted in FIG. 4B can also be readily provided by other wireless communications systems. Such systems can include Wi-Fi but they also include Specialized Mobile Radio systems or SMRs, which are well-known to those of ordinary skill in the art.

For claim construction purposes, communications networks, wireless communications networks and the like, should be construed to include cellular networks as well as SMRs authorized by F.C.C. Rule 47 C.F.R., Part 90, which is incorporated herein by reference. Such systems are well known to those or ordinary skill in the two-way radio systems art. The interface 462 and spline curve generator 414 and equivalents thereof thus cause or effectuate a wireless data broadcast into a constrained environment through or via a wireless communications network.

The embodiment of FIG. 4B avoids misidentifying a vehicle using pattern matching required by the embodiments shown in FIG. 4A but at an additional expense and additional complexity. More particularly, the embodiment shown in FIG. 4B requires the truck 310 to be equipped with wireless communications equipment, which can establish a two-way or bi-directional data connection to the wireless communications network interface 462 via the wireless communications network 458.

The system in FIG. 4B thus provides data into a constrained environment and from which representations of necessary steering guidance can be provided to the vehicle and by which a vehicle's movement will substantially conform to a smoothed curving line path's shape required to move the vehicle toward the final ending location. Unlike the system of FIG. 4A, in FIG. 4B, the data is wirelessly broadcast into the constrained environment by a cellular carrier.

FIGS. 5A-5C, depict steps of a method 500 by which a spline curve is generated for an identified vehicle needing to be backed into a parking space in a constrained environment. As stated above, the shape of the generated spline is "tailored" to accommodate the physical and maneuvering characteristics of the particular identified vehicle, which is to be safely moved backwardly through the constrained environment from an initial location to a desired destination. The generated spline curve's shape is also "tailored" to objects in the constrained environment. In that regard, a generated spline curve might or might not have inflection points, i.e., control points and substantially straight segments that depict where a particular vehicle in a particular constrained environment might have to move forward and backward repetitively with relatively small angular displacements between successive movements in order for the vehicle to be turned or "pointed" toward a desired ending location.

In FIGS. 3 and 4, the end points of circle segments A, B and C are joined together by what appear to be substantially straight lines, which are identified by reference letters D, E and F. Segments D, E and F are short. Because the lines D, E and F are short, they cannot be identified with particularly but could be segments of mathematical functions for one or more of a straight line, a parabola or an ellipse, as long as segments D, E and F properly link segments A, B and C to form a mathematical spline.

Referring now to FIG. 5A, in step 502, an occupancy grid map for a confined constrained environment is generated from digital images of the constrained environment as described above. In an alternative embodiment, an occupancy grid map can be generated using 2 or 3-dimensional, mathematical models of objects in the constrained environment, which could itself also be a mathematical model. Models of objects are often used in computer aided design (CAD) systems.

In step 504, a vehicle to be moved through the constrained environment and its current location and which is to be moved, e.g., backed, to a second or desired location is identified as described above. Its location in the constrained environment is also mapped onto the occupancy grip map.

In step 506, physical and maneuvering characteristics for the identified vehicle are retrieved from a database as described above. In an alternate environment, however, those physical and maneuvering characteristics are provided by the vehicle itself to a controller or processor that will generate a spline curve through the constrained environment for the vehicle.

In step 508, a starting and ending location for the vehicle is identified using Cartesian coordinates of the identified vehicle's current location, i.e., its location at the time that digital images of the vehicle are captured, relative to a desired ending location, which is also identified by its Cartesian coordinates on the occupancy grid map.

As stated above, a mathematical spline curve is formed by connecting together segments of mathematical functions. The size and shape of the spline, however, needs to extend around objects between the identified vehicle and the desired ending location such that the spline's shape will also provide margins for the identified vehicle.

Curved sections of a spline curve will of course have radii. The radii of the curved sections correspond to the identified vehicle's turning diameter as well as the side margins required by the identified vehicle. Stated another way, the curved sections of the spline curve should have radii of curvature not less than one-half the turning diameter of the identified vehicle. Such a minimum radius of curvature assures the identified vehicle will be able to follow the spline around obstacles in the constrained environment.

In step 510, mathematical representations of circles are "generated" by the spline curve generator 414. The number of circles that are generated and their corresponding diameters, are iteratively changed incrementally by the spline curve generator 414 until the generator 414 effectively determines by experimentation, a number of segments of various lengths, having possibly the same or different curvature radii, will form a smooth, curved and continuous line, i.e., a spline curve, between the location where the vehicle is currently located and a desired ending location and which will go around obstacles in the constrained environment.

As noted above, the curves in the generated spline curve should have a minimum radius of curvature not less than ½ the identified vehicle's turning diameter. The generated spline curve should also have space or margins on both sides of the spline curve along its length, wide enough for the identified vehicle to safely pass between other objects in the constrained environment which are alongside the generated spline curve. Stated another way, if the identified vehicle follows the spline curve, its margins will be sufficiently wide to allow the identified vehicle to back into the desired ending location without colliding an object in the constrained environment.

A spline curve path for backing a vehicle through a particular constrained environment might require one or more straight line segments in combination with one or more curving segments in order to generate a spline curve without discontinuities between the starting and ending locations. As shown in FIG. 3, the identified vehicle's starting location, spline control points and the vehicle's starting and ending points are mapped onto an Cartesian coordinate system, i.e., the occupancy grid map, for the constrained environment, regardless of whether the spline curve segments are straight or curved.

Referring to FIG. 5B, at step 512, data that represents the Cartesian coordinates of the beginning and end of the spline curve and the spline curve control points is wirelessly broadcast into the constrained environment where it can be received by the vehicle to be parked.

At step 514 in FIG. 5C, in a first embodiment, data representing the spline curve on the occupancy grip map is provided to an autonomous driving system. Angular displacements required of the vehicle's steering mechanism that are required to cause the vehicle to "back over" the path of the generated spline curve on the occupancy grid map, are calculated and continuously updated such that the vehicle follows a path that is the same as or is at least substantially the same as the generated spline curve.

In a second embodiment, data representing the spline curve on the occupancy grip map is provided to a user interface, such as a display screen, on which icons or symbols are displayed that inform a driver a direction and amount by which the vehicle's steering wheel should be rotated to "back over" the path of the generated spline curve on the occupancy grid.

At step 516, after the vehicle has moved, the vehicle's location is redetermined. In the preferred embodiment, the spline curve's shape is thereafter iteratively changed by re-calculation as the vehicle moves forwardly or backwardly and then re-sent to the vehicle to assure the vehicle's adherence to a path that will route the vehicle safely to the desired destination. Changing the spline curve's shape iteratively should be construed as including changing the spline curve's shape continuously as well as changing its shape substantially continuously.

The preferred embodiment of the apparatus shown in FIG. 3 generates spline curves that can be either interpolating curves or approximating spline curves. Both types of curves can have inflection points, which are considered herein to be points with x, y coordinates where the polarity or direction of the spline curve's slope changes. Stated another way, an inflection point is a point where the spline curve's direction changes.

What is claimed is:

1. A method of generating steering guidance required to move a particular vehicle through a constrained environment from a starting location to a final ending location, the method comprising:

generating a smoothed curving line path through the constrained environment, which extends at least part way between a first location and a second location, the curving line having a shape generated responsive to maneuvering characteristics of the vehicle and objects in the constrained environment, the curving line extending around objects such that when the vehicle follows the curving line, the vehicle can travel backwardly in the constrained environment and reach the second location without collision with an object; and effecting a wireless broadcast of data into the constrained environment from which representations of steering guidance can be provided to the particular vehicle and by which the particular vehicle's movement will substantially conform to the smoothed curving line path's shape wherein the smoothed curving line path is generated by a processor, which receives images from cameras, which are configured to capture images of the constrained environment and configured to capture images of the particular vehicle.

2. The method of claim 1, wherein the smoothed curving line path comprises a spline curve and wherein the step of generating a smoothed curving line path comprises:

generating a plurality of segments of mathematical functions, on an occupancy grid map representation of the constrained environment, each generated segment having corresponding characteristics of its shape, at least some of the segments being within the constrained environment;

mathematically superimposing at least some of the generated segments on the occupancy grid map; and identifying superimposed segments which when concatenated, form at least part of a spline curve on the occupancy grid map and at least part way through the constrained environment.

3. The method of claim 2, wherein the shapes of the generated segments are determined, responsive to maneuvering characteristics of the particular vehicle.

4. The method of claim 3, wherein at least two of the mathematically superimposed segments overlap.

5. The method of claim 2, wherein the spline shape represents forward or backward directional movement of the particular vehicle required to move it from the starting location to the final ending location through the constrained environment.

6. The method of claim 2, wherein the spline curve comprises at least one of: an interpolating curve, which passes through a control point; and an approximating curve, which passes near but not through a control point.

7. The method of claim 1, wherein the spline curve comprises at least one inflection point.

8. The method of claim 1, wherein the spline curve comprises a segment, which is substantially elliptic.

9. The method of claim 1, wherein the spline curve comprises a segment, which is substantially straight.

10. The method of claim 1, wherein the spline curve comprises a segment, which is substantially circular.

11. The method of claim 1, wherein the particular vehicle's physical characteristics comprise: turning radius, length and wheel base.

12. The method of claim 1, wherein the particular vehicle comprises a box truck.

13. The method of claim 1, wherein the particular vehicle comprises a tractor trailer combination, and wherein the particular vehicle's characteristics comprise a trailer pivot point, a trailer length, a turning ratio and wheel base of the tractor-trailer combination.

14. The method of claim 1 wherein the constrained environment is a loading bay.

15. The method of claim 1, wherein the cameras are located away from the particular vehicle.

16. A method of generating images on a display device, which images represent a particular vehicle's steering wheel movements required to move the particular vehicle forwardly or backwardly through a constrained environment from a starting location to a final ending location, the method comprising:
    generating a spline curve through the constrained environment, the spline curve extending between the starting location and the final ending location and having a shape that is generated responsive to physical characteristics of the particular vehicle and physical characteristics of an object in the constrained location, the spline curve's shape corresponding to at least part of a path for the particular vehicle to travel around said object in the constrained environment and toward the final ending location; and
    effecting a wireless broadcast of data into the constrained environment from which representations of steering wheel movement, can be generated and displayed on a display device and by which the vehicle's movement will substantially conform to the generated spline curve's shape, the displayed steering wheel movement being movements required to move the particular vehicle along the generated spline curve;
    wherein the spline curve is generated by a processor, which receives images from cameras configured to capture images of the constrained environment and configured to capture images of the particular vehicle in the constrained environment.

17. The method of claim 15, wherein generating a spline curve comprises:
    generating a plurality of segments of mathematical functions on an occupancy grid map representation of the constrained environment, at least some of the segments being within the constrained environment;
    mathematically superimposing at least some of the generated segments on the occupancy grid map; and
    identifying superimposed segments which when concatenated, form at least part of a spline curve on the occupancy grid map and at least part way through the constrained environment.

18. The method of claim 17, wherein the shapes of the generated segments are determined responsive to maneuvering characteristics of the particular vehicle.

19. The method of claim 18, wherein the spline shape represents forward or backward directional movement of the particular vehicle required to move it from the starting location to the final ending location through the constrained environment.

20. The method of claim 19, wherein the spline curve comprises at least one of: an interpolating curve, which passes through a control point; and an approximating curve, which passes near but not through a control point.

21. The method of claim 20, wherein the spline curve comprises at least one inflection point.

22. The method of claim 21, wherein the spline curve further comprises a substantially straight segment.

23. The method of claim 22, wherein particular vehicle's physical characteristics comprise: turning radius, length and wheel base.

24. The method of claim 22, wherein the particular vehicle comprises a tractor trailer combination, and wherein the particular vehicle's characteristics comprise the trailer pivot point, the length, turning radios and wheel base of the tractor-trailer combination.

25. The method of claim 16, wherein the cameras are separate from the vehicle.

26. An apparatus for generating images on a display device, the generated images representing vehicle steering required to move a particular vehicle through a constrained environment from a first location to a second location, the apparatus comprising:
    a plurality of cameras, each camera having a corresponding field of view of the constrained environment and which are configured to capture images of the particular vehicle in the constrained environment;
    a computer having inputs and outputs, the computer being coupled to the cameras and receiving captured image information therefrom;
    memory coupled to the computer, the memory storing a vehicle database and executable instructions for the computer such that when the instructions are executed, the computer is configured to;
        receive image information comprising images of objects within the cameras' fields of view;
        generate an occupancy grid map of an area at which the cameras are directed;
        identify objects on the occupancy grid map and identify their locations on said occupancy grid map;
        identify the particular vehicle on the occupancy grid map and the identified-vehicle's location on the occupancy grid map; and
        generate data from which an image of a smoothed, curving line can be generated on a display device, the smoothed curving line representing a path for the identified particular vehicle to travel through the constrained environment in a reverse direction from the first location to the second location.

27. The apparatus of claim 26, wherein each camera of the plurality of cameras is located away from the particular vehicle.

28. An apparatus for generating images on a display device, which images represent a particular vehicle's steering required to move a vehicle through a constrained environment from a first location to a second location, the apparatus comprising:
    a plurality of cameras, each camera having a corresponding field of view and which are configured to capture images of the particular vehicle in the constrained environment;
    a computer having an input and an output, the computer being coupled to the cameras and coupled to a communications network;
    memory coupled to the computer input and storing executable instructions for the computer;

wherein the computer is configured to:
  receive image information from the cameras, the image information comprising images of objects within the cameras' fields of view;
  generate an occupancy grid map of an area at which the cameras are directed;
  identify objects on the occupancy grid map and their locations on said grid;
  receive from the communications network, data representing maneuvering characteristics of the first particular vehicle within the constrained environment and which is located on the generated occupancy grid map; and
  generate data from which a smoothed, curving line can be generated on a display device, the smoothed curving line displayed on the display device representing a path that the first vehicle can travel in a reverse direction through the constrained environment in order to move from the first location to the second location without colliding with an object.

29. The apparatus of claim 28, wherein each camera of the plurality of cameras is located away from the particular vehicle.

* * * * *